(No Model.)
H. RIESENBERG.
HORSE DETACHER.
No. 395,589. Patented Jan. 1, 1889.
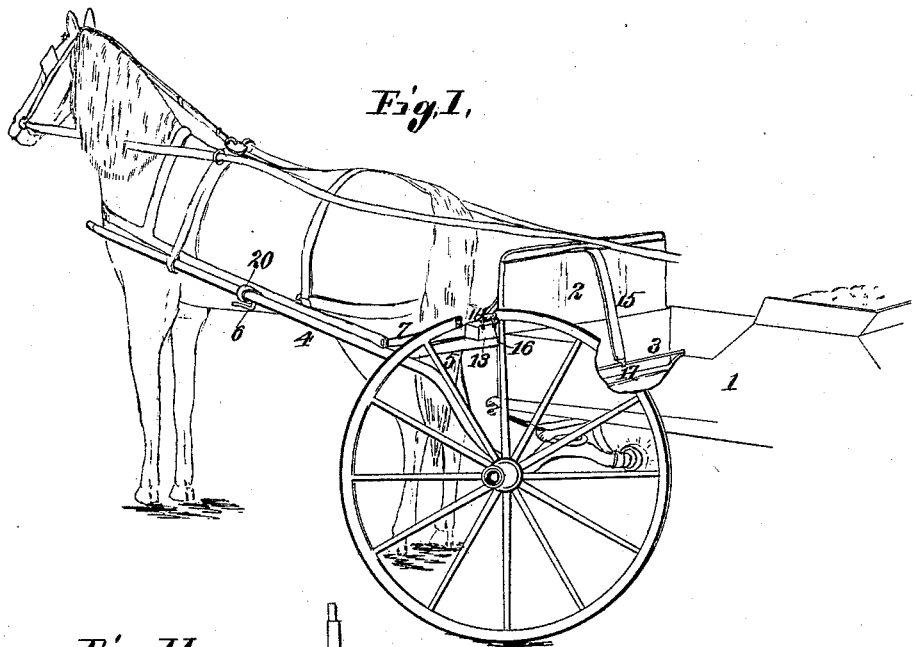
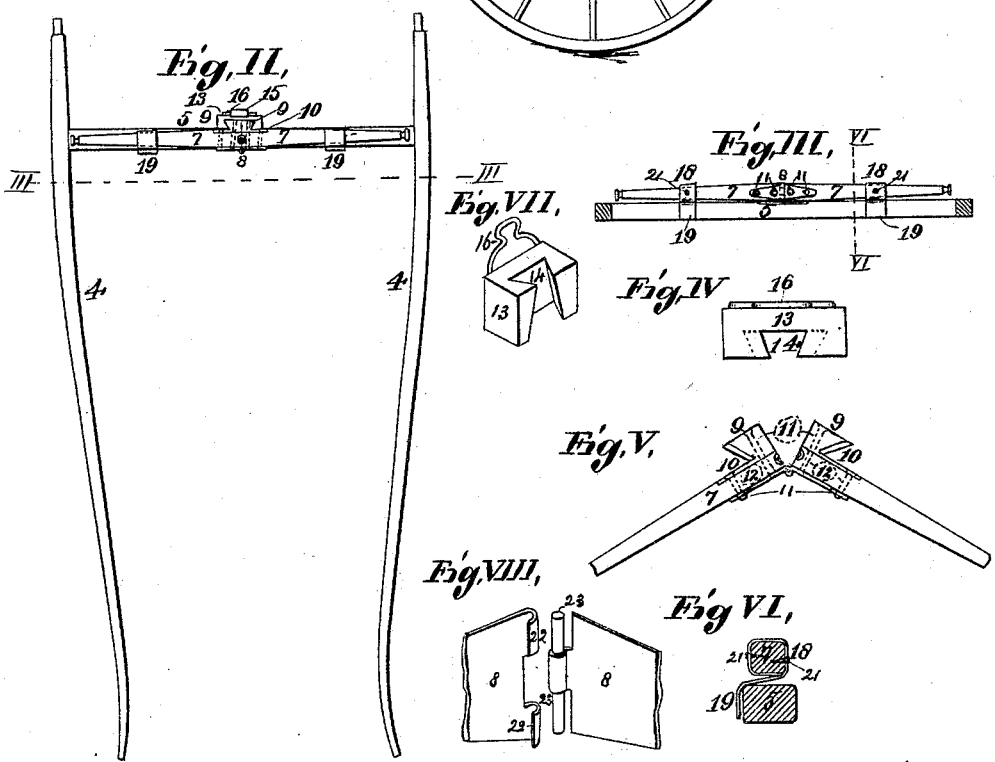
Attest
G. N. Hinchman Jr.
E. Arthur
Inventor:
Harry Riesenberg.
By Knight Bro's.
Atty's.

UNITED STATES PATENT OFFICE.

HARRY RIESENBERG, OF ST. LOUIS, MISSOURI.

HORSE-DETACHER.

SPECIFICATION forming part of Letters Patent No. 395,589, dated January 1, 1889.

Application filed October 15, 1888. Serial No. 288,075. (No model.)

*To all whom it may concern:*

Be it known that I, HARRY RIESENBERG, of the city of St. Louis, in the State of Missouri, have invented a certain new and useful Improvement in Safety Sectional Singletrees and Horse-Detachers, of which the following is a full, clear, and exact description, reference being had to the accompanying drawings, forming part of this specification.

This invention relates to a sectional hinged singletree with an attachable and detachable clamp and pendent equalizing-straps that disengage their hold when the singletree is unclamped; and the invention consists in features of novelty hereinafter fully described, and pointed out in the claims.

Figure I is a perspective view of a buggy and horse to which my detachable devices are attached. Fig. II is an enlarged top view, and shows the shafts with the sectional singletree clamped for the attachment of the draft, and the equalizing-straps that hang pendent in front of the cross-tree of the shafts. Fig. III is an enlarged horizontal section taken on line III III, Fig. II, and shows a front view of the sectional singletree. Fig. IV is an enlarged top view of the clamp by which the sectional singletree is rigidified, the flaring recess at bottom shown in broken lines. Fig. V is an enlarged detail of the sectional singletree, shown in its detaching position, and shows the tapered dovetailed catch-block attached thereto. Fig. VI is an enlarged vertical section taken on line VI VI, Fig. III, and shows one of the pendent equalizing-straps secured to the singletree and in contact with the cross-tree of the shafts. Fig. VII is an enlarged perspective view of the clamping-block, and shows the flaring recess therein that clutches the sectional catch-block; and Fig. VIII is an enlarged detail view of the knockdown hinge, that, when its sections are coupled, unite the sections of the singletree.

Referring to the drawings, in which similar figures indicate like parts in all the views, 1 represents a buggy to which my detaching devices have been attached.

2 is the dash-board; 3, the foot-bar; 4, the shafts; 5, the cross-tree of said shafts, and 6 the holdback-hook attached to the shafts.

7 represents the sections of the cut singletree, and 8 the knockdown hinge that secures the sections together while in operative position, but is detachable by the release of its loose hooks 22 from the coupling-pin 23.

9 represents the sections of the tapered dovetail catch-block; 10, the attachment-straps integral therewith; 11, rivets that pass through the sockets 12 in the sections of the catch-block and its strap and the sections of the singletree and its knockdown hinge, and which sockets terminate at each end with countersinks in which said rivets are headed, and thus securely hold both the hinge and the sections of the dovetail catch-block.

While I have shown and described the above-stated means of attaching the catch-block and hinge, they may, if desired, be secured by any other suitable means.

13 represents the clamping-block, which is provided with a recessed tapered or flaring dovetail, 14, that, when the sections of the cut singletree are brought into operative position, fits with a clutch-hold on the sectional catch-block, and thus holds the sectional singletree in its rigid position. It will be seen that as the sectional catch-block is tapered toward the top, and as the corresponding recess in the clamping-block is made flaring at bottom, so the clamping-block sits down freely on the sectional catch-block, and as freely, when elevated by the draw-strap, releases its hold; also, the tapered flaring relative shape of the parts enables the sectional catch-block to vertically hold the clamping-block, while at the same time the latter block holds the sections of the former one from horizontal expansion, which would result in the folding and release of the singletree.

15 represents the detachment draw-strap, that is secured onto the bail 16 at the top of the clamping-block, and which strap passes up over the dash-board between it and the rein-carrier bar and downward to the foot-bar, with which its terminal snap-hook 17 engages, and so holds said strap.

18 represents the equalizing-straps, which are of metal, and preferably of steel, and are strapped part way or all around the singletree; but instead of being, as usual, looped around the cross-tree of the shafts, lugs 19 hang pendent from said straps in front of the cross-tree of said shafts. Said straps are secured to the singletree by screws 21.

The holdback-straps that connect with the breeching, instead of being, as usual, wound around the shafts and passed through leather loops secured thereto, (which disallows the automatic withdrawal of their hold when otherwise the horse is detached,) are simply passed from the breeching over the shafts and in front of the holdback-hooks 6, that are secured beneath said shafts, and back to their buckled connection with their initial ends.

It will thus be seen that when the horse is detached from the singletree the holdback-straps freely release their holds from the shafts. If the horse is running away and the occupants of the vehicle do not wish to accompany him on his perilous journey, all that is necessary is for the driver or one of the occupants of the front seat to draw on the detaching-strap 15, and thus pull the clamping-block 13 from its engagement with the sectional catch-block 9. The sectional singletree then ceases to be longitudinally rigid, and by the effect of the tug-draft it folds forward, turning on the hinged connection at its sectional junction and is released from the draft-bolt, and the sections of said singletree freely disconnect by the uncoupling of the sections of the knockdown hinge, so that the singletree does not (as otherwise would be the case) thrash the horse's heels and add to his fright. It will also be seen that as my metal pendent equalizing-strap hangs only in front of the cross-tree of the shafts, instead of around said cross-tree, as is usual with the leather equalizing-strap, therefore, when the clamping-block is removed, allowing the sectional singletree to fold, the pendent lugs of the metal equalizing-straps, being in front of said cross-tree, do not, as would the old equalizers, obstruct the fold of the singletree and the consequent detachment of the horse. So, also, the holdback-hooks to the shafts and loose looped holdback-straps from the breeching allow the horse free detachment from the shafts, as the other devices do from the draft attachment.

I claim as my invention—

1. In a horse-detaching device, the combination of the sectional-cut singletree, the knockdown hinges that connect the sections of said singletree, the sectional dovetail tapered catch-block 9, and the clamping-block 13, substantially as and for the purpose set forth.

2. In a horse-detaching device, the combination of the sectional-cut singletree, the knockdown hinge that connects the sections of said singletree in front, the sectional catch-blocks at its back, the clamping-block, and the metal equalizing-straps 18, with their pendent lugs 19, substantially as and for the purpose set forth.

3. In a horse-detaching device, the combination of the sectional-cut singletree, the knockdown hinge that connects the sections of said singletree in front, the sectional dovetail tapered catch-block 9 at its back, the clamping-block 13, that clutches and couples the sections of said catch-block, the bail 16 on said clamping-block, the draw-strap 15 attached to said bail, and the snap-hook 17, that attaches said strap to the foot-bar, substantially as and for the purpose set forth.

4. In a horse-detaching device, the combination of the sectional-cut singletree, the knockdown hinge 8, sectional-tapered catch-block 9, clamping-block 13, attachment bail 16, the draw-strap 15, by which the detachment is operated, the metal equalizing-straps 18, with pendent lugs 19, and the holdback-hooks 6, secured to the shafts, with which the holdback-straps engage, substantially as and for the purpose set forth.

HARRY RIESENBERG.

In presence of—
BENJN. A. KNIGHT,
SAML. KNIGHT.